United States Patent [19]

Wallis

[11] 4,028,232

[45] * June 7, 1977

[54] SEPARATOR METHOD AND APPARATUS

[75] Inventor: James William Wallis, Larefield, England

[73] Assignee: Wallis Separators Limited, Sittingbourne, England

[*] Notice: The portion of the term of this patent subsequent to Feb. 4, 1992, has been disclaimed.

[22] Filed: Aug. 8, 1975

[21] Appl. No.: 603,092

[30] Foreign Application Priority Data

Aug. 9, 1974 United Kingdom ............. 35290/74

[52] U.S. Cl. ................................. 210/19; 209/269; 209/365 R; 210/DIG. 22; 210/389
[51] Int. Cl.² ......................................... B01D 35/20
[58] Field of Search ............................ 55/15, 277; 210/DIG. 22, 19, 389; 209/1, 269, 365

[56] References Cited

UNITED STATES PATENTS

| 3,305,481 | 2/1967 | Peterson | 210/19 |
| 3,327,401 | 6/1967 | Sigmas et al. | 210/19 X |
| 3,387,379 | 6/1968 | Goble | 55/15 X |
| 3,864,249 | 2/1975 | Wallis | 210/19 |

Primary Examiner—Theodore A. Granger
Attorney, Agent, or Firm—Finnegan, Henderson, Farabow & Garrett

[57] ABSTRACT

A separator for effecting separation of solid materials from liquids has a filter screen arranged so that in operation liquid passes through that screen and solid materials are retained on and travel along that screen in a first direction. Generator means is provided for subjecting the screen to acoustic pressure waves, the generator means being arranged close to but not touching the screen so that in operation liquid passing through the screen couples acoustic pressure waves from the generator means to the screen. The generator means is an acoustic pressure wave transducer assembly that stretches at least nearly the whole way across the filter screen in a second direction transverse to said first direction. Preferably the generator means produces ultrasonic pressure waves and comprises a casing and a plurality of individual ultrasonic transducers within the casing so that a relatively uniform field of ultrasonic waves is produced over the entire width of the screen. The generator means is adjustable relative to the screen both towards and away from it and in said first direction.

7 Claims, 4 Drawing Figures

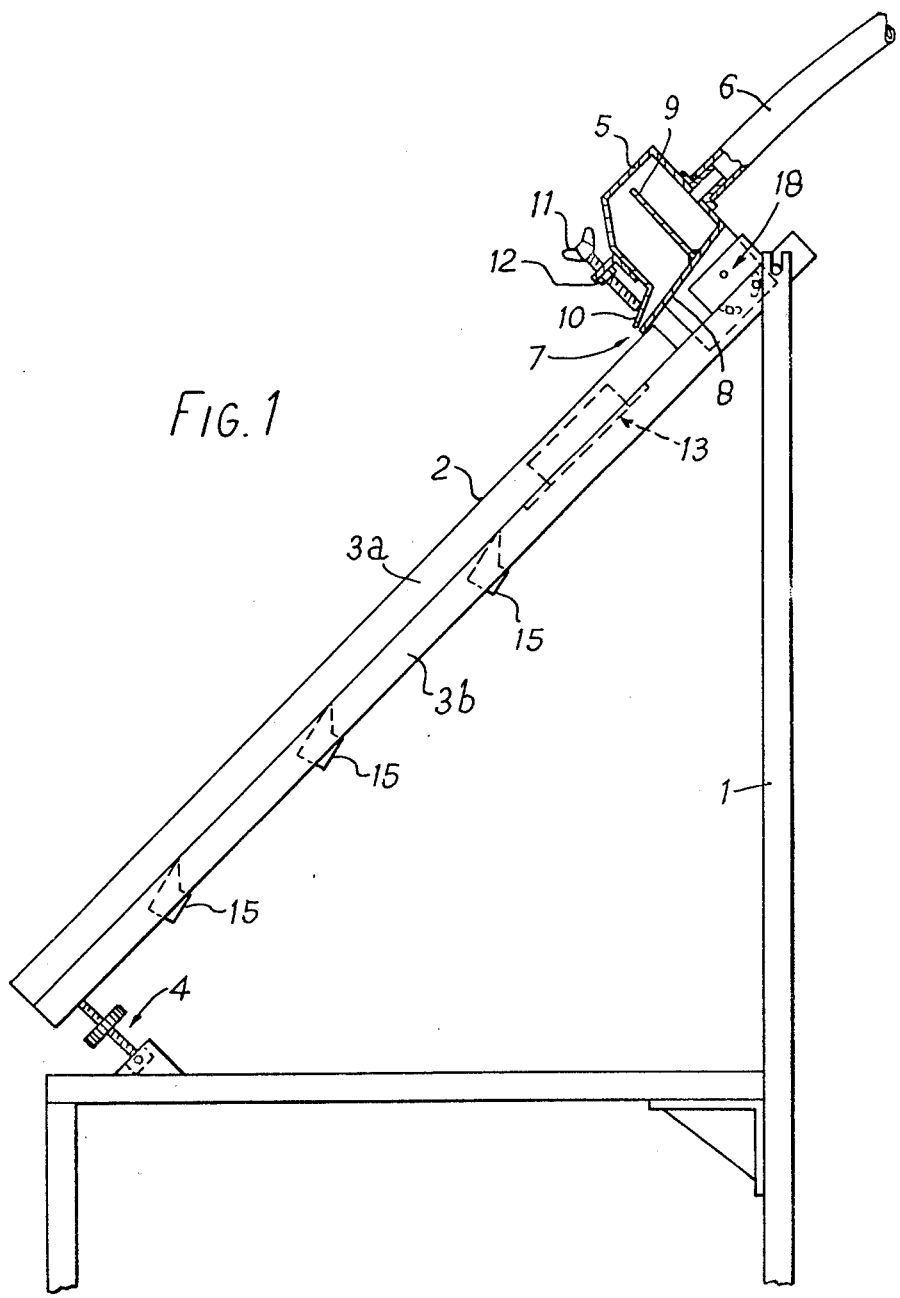

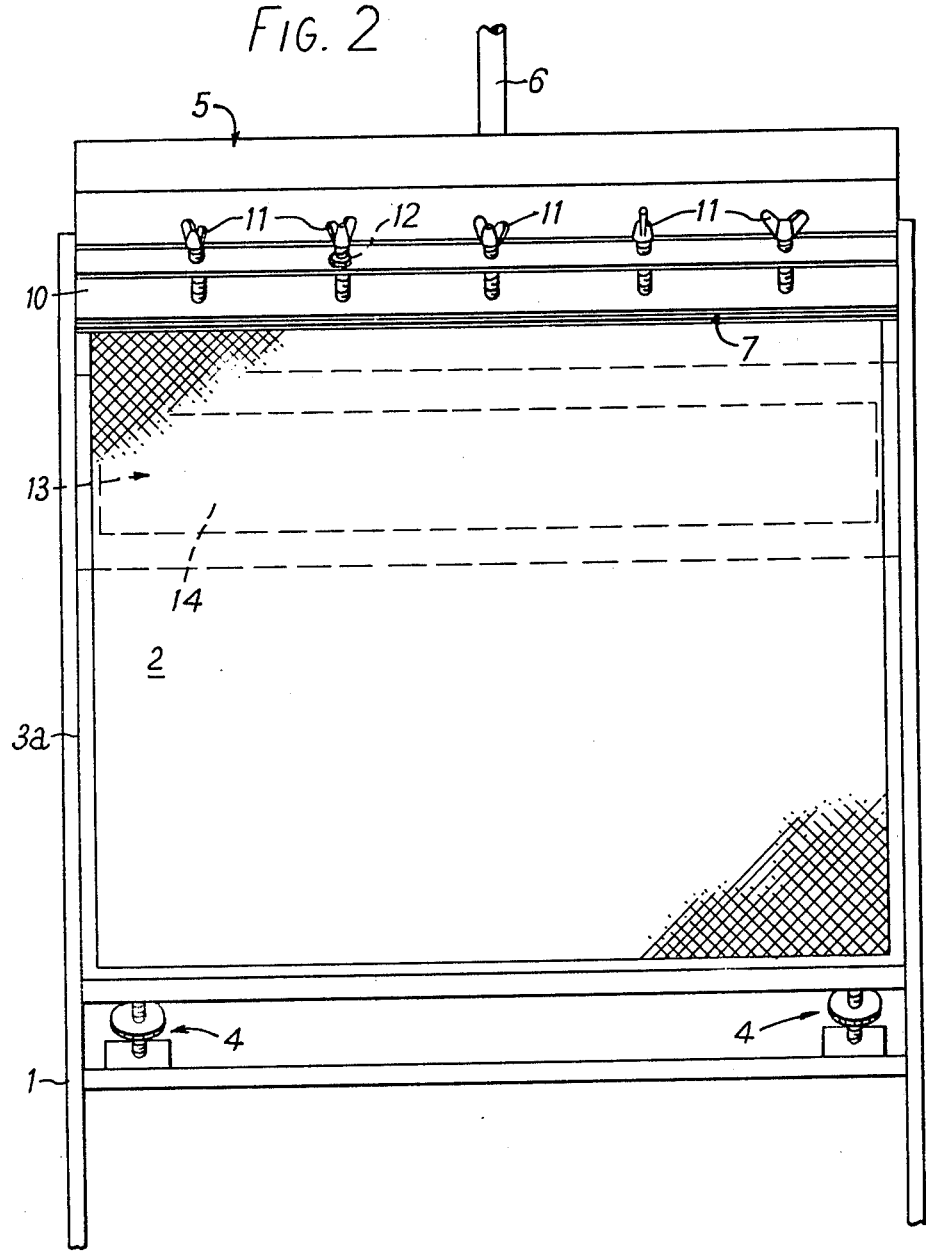

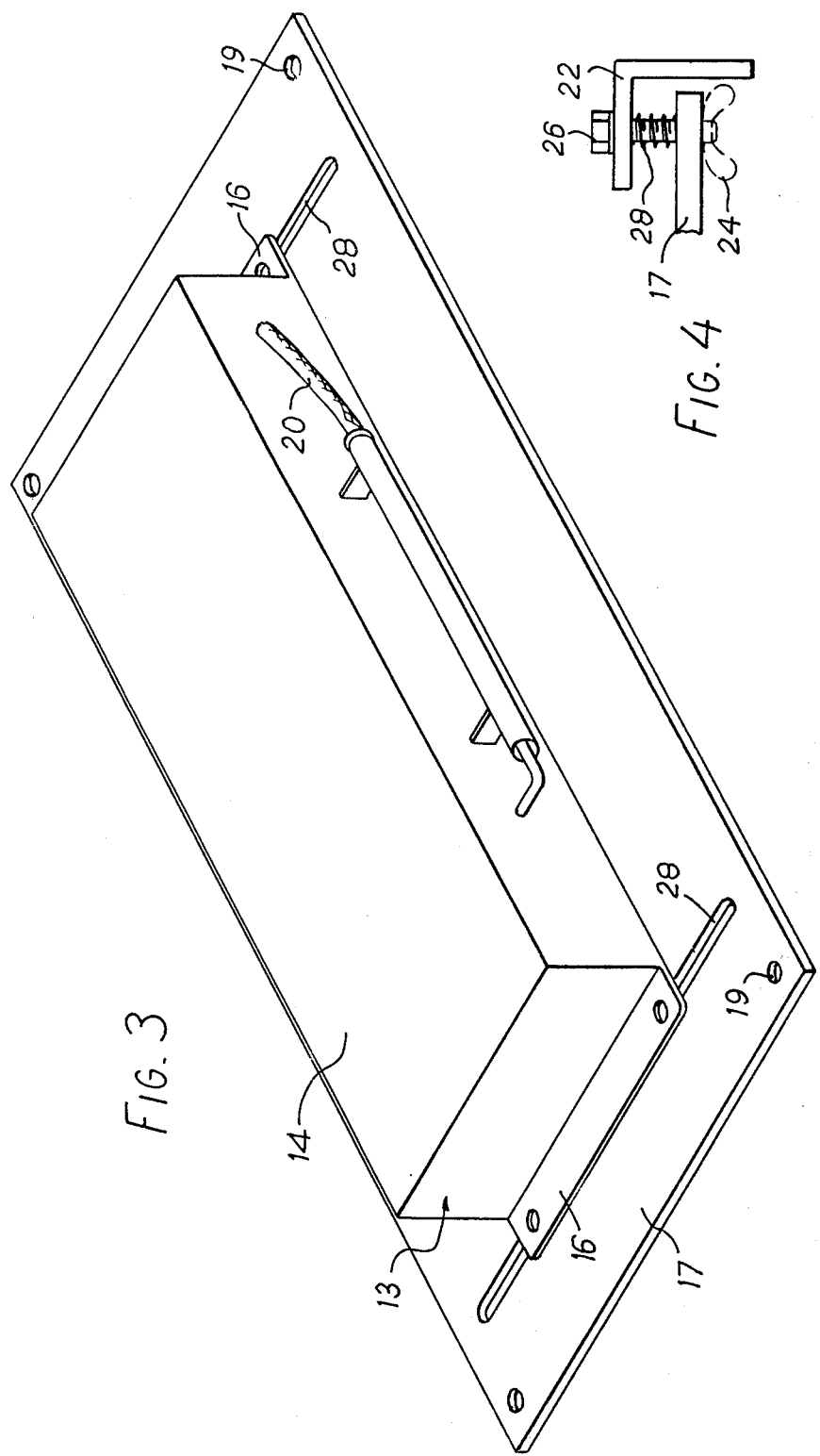

SEPARATOR METHOD AND APPARATUS

This invention relates to the separation of solid materials from liquids.

U.S.A. Pat. No. 3,864,249, assigned to Wallis Separators, describes such separation by a separator which includes inter alia a filter screen and means for subjecting that screen to acoustic pressure waves comprising an acoustic pressure wave transducer arranged close to but not touching the filter screen so that in operation liquid passing through the screen couples acoustic pressure waves from the transducer to the screen, the arrangement being such that in operation liquid passes through the filter screen and solid materials are retained thereon and travel along the filter screen.

The problem to be solved by the present invention and its object is to provide such separation and such a separator of improved efficiency.

A separator according to the invention comprises a filter screen arranged so that in operation liquid passes through that screen and solid materials are retained on and travel along that screen in a first direction, and generator means for subjecting that screen to acoustic pressure waves, the generator means being arranged close to but not touching the filter screen so that in operation liquid passing through the filter screen couples acoustic pressure waves from the generator means to the filter screen, the generator means being an acoustic pressure wave transducer assembly that stretches at least nearly the whole way across the filter screen in a second direction transverse to said first direction.

The term "acoustic pressure waves" in the context of this specification include pressure waves of both sonic and ultrasonic frequency. Preferably the generator means subjects the filter screen to ultrasonic pressure waves and comprises a casing and a plurality of individual ultrasonic transducers within the casing, the arrangement of the individual transducers being such that in operation there is produced a relatively uniform field of ultrasonic waves over the entire width of the filter screen. The generator means may have securing means securing it relative to the filter screen, the securing means incorporating distance adjustment means whereby the perpendicular distance of the generator means from the filter screen may be varied. Additionally the securing means may incorporate position adjustment means whereby the position of the generator means relative to the filter screen may be varied in said first direction.

A process of separation according to the invention includes the steps of delivering a mixture of solid material and a liquid to a filter screen so that the liquid passes through the filter screen and the solid materials are retained on and travel along the filter screen in a first direction, and subjecting the filter screen to acoustic pressure waves coupled to the filter screen from a generator means by way of the liquid passing through the filter screen, the acoustic pressure waves emanating from the generator means along nearly the whole way across the filter screen in a direction transverse to said first direction. Preferably the process includes the step of adjusting the perpendicular distance of the generator means from the filter screen. Additionally the process preferably includes the step of adjusting the position of the generator means relative to the filter screen in said first direction.

A preferred form of separator embodying the invention and for performing the process provided by the invention will now be described by way of example with reference to the accompanying drawings in which:-

FIG. 1 is a side elevation of the separator,
FIG. 2 shows it in front elevation,
FIG. 3 is a perspective view of its generator assembly and mounting plate, and,
FIG. 4 shows how the mounting plate is adjustably mounted on a sub-frame.

Referring to FIGS. 1 and 2, the separator comprises a support frame 1, carrying an inclined filter screen 2 of perforated stainless steel mesh which is held taut by a screen frame 3a seated upon a sub-frame 3b pivotally mounted on the support frame. The angle of the filter screen to the horizontal may be varied by means of mounting screws 4 positioned between the support frame and the sub-frame. Mounted above the filter screen is a header box 5 having an inlet pipe 6 and a variable outlet orifice 7. The header box is pivotably mounted on mounting brackets 18 so that it can pivot about a horizontal axis and in the drawings is arranged so that the floor 8 of the header box is at an angle of about 5° to the plane of the filter screen. Positioned inside the header box is a baffle 9 which extends from the floor of the header box. The outlet orifice 7 of the header box is formed by the floor 8 and an adjustable plate 10 hinged to the header box. The edge of the floor 8 forming the outlet orifice is rounded to ensure that the solid/liquid mixture breaks cleanly from the orifice, and the leading edge of plate 10 is formed as a knife edge with an angle of 20° to the top surface so that the ground portion is in orifice 7. Mounted on the header box above the plate 10 are a number of adjustable screws 11 which bear on the plate 10 and enable the profile of the orifice to be altered. The screws 11 pass through screw-threaded mountings 12.

Mounted beneath the filter screen is a generator means generally indicated 13 for producing ultrasonic energy. It includes a casing 14 having a length of about 660 mm, a width of 150 mm and a height of 100 mm. It also includes a number of individual transducers 15 (four in this instance) contained within the casing along its length so as to produce a fairly uniform field of ultrasonic waves from one end to the other of a frequency of about 25 kilocycles. The circuitry (not shown) for the transducers is also inside the casing.

At each end, the casing 14 has a mounting flange 16, by which it is mounted by bolts and nuts (not shown) on a mounting plate 17, the bolts passing through slots 28 in the plate about 8 inches in length. The mounting plate 17 is itself provided with holes 19 near its four corners whereby it is fixed in position to angle pieces 22 forming part of the sub-frame 3b on the separator by means of wing nuts 24 screwed onto a headed bolt 26 passing through the angle pieces 22 and the holes 19. A spring 28 is mounted over each bolt 26 between the angle piece 22 and the plate 17. Electric power for the transducer is supplied through a cable 20.

The generator 13 is mounted on its plate immediately underneath the filter screen which is only slightly wider than the length (660 mm) of the casing 14 so that the casing 14 stretches approximately the whole way across the screen, transversely to the direction of fall of the screen. Angle pieces 15 are arranged downstream of the generator 13 and touching the screen 2. Details of various working parameters are set out in our earlier patent to which reference may be made.

In operation solid/liquid mixture from the inlet 6 passes to the header box 5 and over the baffle 9. The orifice 7 is adjusted by means of the screws 11 to give the appropriate profile and rate of flow. The casing 14 is adjusted in position in the direction of fall of the screen along the slots 28 in the plate 17, and its distance from the screen 2 is adjusted by the wing nuts 24 within the range of about ¼ inch to 1 inch. The solid/liquid mixture after emerging from the orifice 7, contacts the screen 2, whereupon the liquid passes through it and the solid is retained and carried down the screen in the direction of its line of fall. The efficiency of the separator is much improved by adjustment of the position of the generator 13 relatively to the screen 2 to achieve optimum results and its efficiency is enhanced by the extent of the generator, stretching as it does nearly the entire width of the screen. Also the ultrasonic energy produced by the generator 13 keeps the screen free. The angle pieces 15 break the surface tension of the liquid. The separated liquid is run off from beneath the screen and the solid material collects at the foot of the screen.

What I claim and desire to secure by Letters Patent is:-

1. A separator for effecting separation of solid materials from liquids which comprises a filter screen, said filter screen being so arranged that in operation liquid passes through said filter screen and solid materials are retained on and travel along said filter screen in a first direction, generator means for subjecting said filter screen to acoustic pressure waves, said generator means being arranged close to but not touching said filter screen so that in operation liquid passing through said filter screen couples acoustic pressure waves from said generator means to said filter screen, said generator means being an acoustic pressure wave transducer assembly that stretches at least nearly the whole way across said filter screen in a second direction transverse to said first direction.

2. A separator according to claim 1, in which said generator means comprises a casing and a plurality of individual ultrasonic transducers within said casing, the arrangement of said individual transducers being such that in operation there is provided a relatively uniform field of ultrasonic waves over the entire width of said filter screen.

3. A separator according to claim 2, comprising securing means securing said generator means relative to said filter screen, said securing means incorporating distance adjustment means whereby the perpendicular distance of said generator means from said filter screen may be varied.

4. A separator according to claim 3, wherein said securing means additionally incorporates position adjustment means whereby the position of said generator means relative to said filter screen may be varied in said first direction.

5. A process for effecting separation of solid materials from liquids which includes the steps of delivering a mixture of solid material and a liquid to a filter screen so that said liquid passes through said filter screen and said solid materials are retained on and travel along said filter screen in a first direction, and subjecting said filter screen to acoustic pressure waves coupled to said filter screen from a generator means by way of said liquid passing through said filter screen, said acoustic pressure waves emanating from said generator means along nearly the whole way across said filter screen in a direction transverse to said first direction.

6. A process according to claim 5 which includes the step of adjusting the perpendicular distance of said generator means from said filter screen.

7. A process according to claim 6 which includes the step of adjusting the position of said generator means relative to said filter screen in said first direction.

* * * * *